US012737024B2

(12) United States Patent
Sadowski et al.

(10) Patent No.: US 12,737,024 B2
(45) Date of Patent: *Sep. 15, 2026

(54) MULTI-DIE SYSTEM PERFORMANCE OPTIMIZATION

(71) Applicants: ADVANCED MICRO DEVICES, INC., Santa Clara, CA (US); ATI TECHNOLOGIES ULC, Markham (CA)

(72) Inventors: Greg Sadowski, Boxborough, MA (US); Sriram Sundaram, Austin, TX (US); Stephen Kushnir, Markham (CA); William C. Brantley, Austin, TX (US); Michael J. Schulte, Austin, TX (US)

(73) Assignees: ATI TECHNOLOGIES ULC, Markham (CA); ADVANCED MICRO DEVICES, INC., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/218,463

(22) Filed: Jul. 5, 2023

(65) Prior Publication Data

US 2024/0143056 A1 May 2, 2024

Related U.S. Application Data

(63) Continuation of application No. 17/029,852, filed on Sep. 23, 2020, now Pat. No. 11,709,536.

(60) Provisional application No. 63/044,552, filed on Jun. 26, 2020.

(51) Int. Cl.

| | |
|---|---|
| ***G06F 1/28*** | (2006.01) |
| ***G05F 1/625*** | (2006.01) |

(52) U.S. Cl.

CPC ................ *G06F 1/28* (2013.01); *G05F 1/625* (2013.01)

(58) Field of Classification Search

None

See application file for complete search history.

(56) References Cited

U.S. PATENT DOCUMENTS

| | | | | |
|---|---|---|---|---|
| 8,719,763 B1 * | 5/2014 | Bickford | .......... | G01R 31/31718 716/132 |
| 2004/0210787 A1 * | 10/2004 | Cox | ........................ | G06F 1/324 713/322 |
| 2007/0222630 A1 * | 9/2007 | Sugama | ........... | G01R 31/31721 340/661 |
| 2011/0119672 A1 * | 5/2011 | Ramaraju | ............. | G06F 9/5044 718/102 |

(Continued)

*Primary Examiner* — Santosh R Poudel

(57) ABSTRACT

A multi-die semiconductor package includes a first integrated circuit (IC) die having a first intrinsic performance level and a second IC die having a second intrinsic performance level different from the first intrinsic performance level. A power management controller distributes, based on a determined die performance differential between the first IC die and the second IC die, a level of power allocated to the semiconductor chip package between the first IC die and the second IC die. In this manner, the first IC die receives and operates at a first level of power resulting in performance exceeding its intrinsic performance level. The second IC die receives and operates at a second level of power resulting in performance below its intrinsic performance level, thereby reducing performance differentials between the IC dies.

14 Claims, 5 Drawing Sheets

(56) References Cited

U.S. PATENT DOCUMENTS

| | | | | |
|---|---|---|---|---|
| 2013/0061064 | A1* | 3/2013 | Ananthakrishnan | G06F 1/3243 713/300 |
| 2013/0113514 | A1* | 5/2013 | Anemikos | H03K 19/0013 716/133 |
| 2014/0082380 | A1* | 3/2014 | Schluessler | G06F 1/3296 713/300 |
| 2015/0046739 | A1* | 2/2015 | Kuemerle | G06F 1/3296 713/340 |
| 2016/0134289 | A1* | 5/2016 | Lesea | G06F 1/26 326/38 |
| 2018/0173296 | A1* | 6/2018 | Mubeen | G06F 1/324 |
| 2019/0097421 | A1* | 3/2019 | Davis | H05B 45/37 |
| 2021/0064426 | A1* | 3/2021 | Gupta | G06F 1/10 |
| 2021/0311537 | A1* | 10/2021 | Srinivasan | G05F 1/66 |

* cited by examiner

MULTI-DIE SYSTEM PERFORMANCE OPTIMIZATION

CROSS-REFERENCE TO RELATED APPLICATIONS

The present application is a Continuation application of U.S. patent application Ser. No. 17/029,852, entitled "MULTI-DIE SYSTEM PERFORMANCE OPTIMIZATION", and filed on Sep. 23, 2020, which claims priority to Provisional Patent Application Ser. No. 63/044,552, entitled "MULTI-DIE SYSTEM PERFORMANCE OPTIMIZATION" and filed on Jun. 26, 2020, the entirety of each is incorporated by reference herein.

BACKGROUND

A multi-chip module (MCM) is generally an electronic package including multiple integrated circuits (ICs or "chips"), semiconductor dies, and/or other discrete components that are integrated into a single package. The various MCM components are often integrated onto a unifying substrate so that the MCM operates as a single component. Multi-chip modules come in a variety of forms depending on complexity, which can range from using pre-packaged ICs on a small printed circuit board (PCB) arranged to mimic the package footprint of an existing chip package, to custom chip packages integrating many chip dies on a high density interconnection (HDI) substrate.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
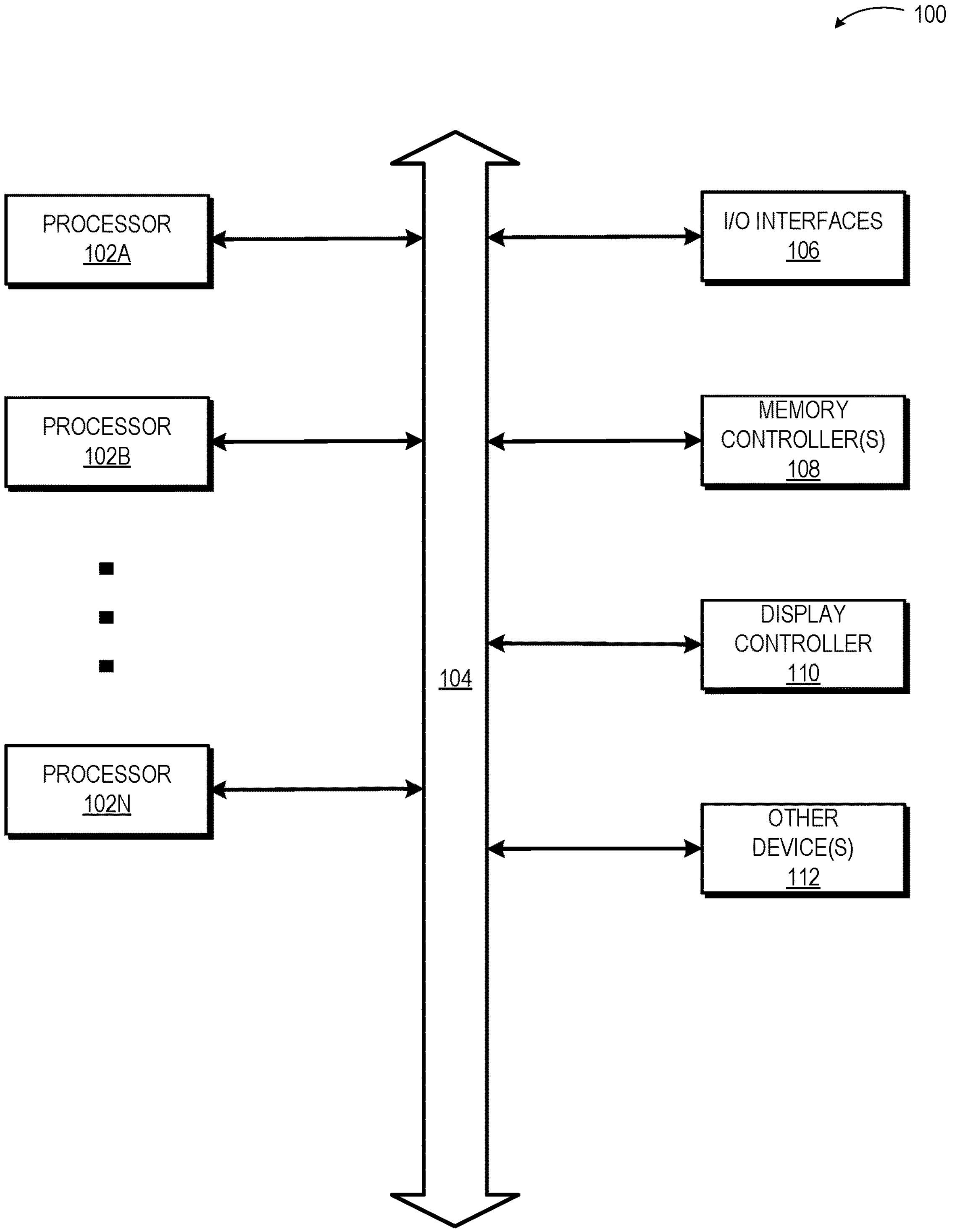
FIG. 1 is a block diagram of a computing system for employing energy distribution in a multi-die processor in accordance with some embodiments.

The manufacturing of a semiconductor chip involves many process steps, and with every step there can be imperfections, process variability, alignment issues, and other factors that cause variations in device performance. For example, due to manufacturing process variances, each individual silicon die on a silicon wafer varies, relative to the other dies, in its individual performance characteristics given a same power source limitation. These variances impact the overall performance of conventional multi-die compute systems that are built with multiple silicon dies packed in groups within MCMs. If a MCM is built from randomly selected dies, then each individual die is likely to perform differently from other dies at the same power level (even amongst multiple dies from a single silicon wafer).

For example, compute systems often include many processors that work together on a parallel bulk-synchronous problem in which both computation and communication/synchronization performance depend on properties of the machine architecture in use. Bulk-synchronous parallelism includes inter-processor communication based on barrier synchronization of all processors. A component of bulk-synchronous parallel processing is referred to as barrier synchronization, where workers (e.g., processors, dies, and the like) reaching a barrier (or other synchronization mechanism) have to wait until all other workers have also reached the barrier. Accordingly, a system that includes multiple processors working together such as multi-die MCMs will be performance constrained by the performance of its slowest processor due to faster processors idling while waiting on the slowest processor to finish compute before barrier synchronization.

To improve overall system performance without changing silicon die manufacturing processes, FIGS. 1-5 describe systems and methods for multi-die performance optimization by energy distribution, or "sloshing", between dies of a multi-die package. In various embodiments, a multi-die semiconductor package includes a first integrated circuit (IC) die having a first intrinsic performance level and a second IC die having a second intrinsic performance level different from the first intrinsic performance level. A power management controller distributes, based on a determined die performance differential between the first IC die and the second IC die, a level of power allocated to the semiconductor chip package between the first IC die and the second IC die. In this manner, the first IC die receives and operates at a first level of power resulting in performance exceeding its intrinsic performance level. The second IC die receives and operates at a second level of power resulting in performance below its intrinsic performance level, thereby reducing performance differentials between the IC dies. From an outside-the-package perspective, a total amount of power utilized by the multi-die package remains the same but overall computation throughput by the multi-die package is increased.

FIG. 1 illustrates a block diagram of one embodiment of a computing system 100 for employing energy distribution in a multi-die processor in accordance with some embodiments. In various embodiments, computing system 100 includes at least one or more processors 102A-N, fabric 104, input/output (I/O) interfaces 106, memory controller(s) 108, display controller 110, and other device(s) 112. In various embodiments, computing system 100 includes a computer, laptop, mobile device, server, or any of various other types of computing systems or devices. It is noted that the number of components of computing system 100 vary in some embodiments. It is also noted that in some embodiments computing system 100 includes other components not shown in FIG. 1. Additionally, in other embodiments, computing system 100 is be structured in other ways than shown in FIG. 1.

Fabric 104 is representative of any communication interconnect that complies with any of various types of protocols utilized for communicating among the components of the computing system 100. Fabric 104 provides the data paths, switches, routers, and other logic that connect the processing units 102, I/O interfaces 106, memory controller(s) 108, display controller 110, and other device(s) 112 to each other. Fabric 104 handles the request, response, and data traffic, as well as probe traffic to facilitate coherency. Fabric 104 also handles interrupt request routing and configuration access paths to the various components of computing system 100. Additionally, fabric 104 handles configuration requests, responses, and configuration data traffic. In some embodiments, fabric 104 is bus-based, including shared bus configurations, crossbar configurations, and hierarchical buses with bridges. In other embodiments, fabric 104 is packet-based, and hierarchical with bridges, crossbar, point-to-point, or other interconnects. From the point of view of fabric 104, the other components of computing system 100 are referred to as "clients". Fabric 104 is configured to process requests generated by various clients and pass the requests on to other clients.

Memory controller(s) 108 are representative of any number and type of memory controllers coupled to any number and type of memory device(s). For example, the type of memory device(s) coupled to memory controller(s) 108 include Dynamic Random Access Memory (DRAM), Static Random Access Memory (SRAM), NAND Flash memory, NOR flash memory, Ferroelectric Random Access Memory (FeRAM), or others. Memory controller(s) 108 are accessible by processors 102, I/O interfaces 106, display controller 110, and other device(s) 112 via fabric 104. I/O interfaces 106 are representative of any number and type of I/O interfaces (e.g., peripheral component interconnect (PCI) bus, PCI-Extended (PCI-X), PCIE (PCI Express) bus, gigabit Ethernet (GBE) bus, universal serial bus (USB)). Various types of peripheral devices are coupled to I/O interfaces 106. Such peripheral devices include (but are not limited to) displays, keyboards, mice, printers, scanners, joysticks or other types of game controllers, media recording devices, external storage devices, network interface cards, and so forth. Other device(s) 112 are representative of any number and type of devices (e.g., multimedia device, video codec).

In various embodiments, each of the processors 102 is a multi-chip module constructed as a semiconductor die package including two or more integrated circuit (IC) dies (shown in more detail below with respect to FIG. 2), such that a processor is usable like a single semiconductor integrated circuit. As used in this disclosure, the terms "die" and "chip" are interchangeably used. Those skilled in the art will recognize that a conventional (e.g., not multi-chip) semiconductor integrated circuit is manufactured as a wafer or as a die (e.g., single-chip IC) formed in a wafer and later separated from the wafer (e.g., when the wafer is diced); multiple ICs are often manufactured in a wafer simultaneously. The ICs and possibly discrete circuits and possibly other components (such as non-semiconductor packaging substrates including printed circuit boards, interposers, and possibly others) are assembled in an MCM.

However, semiconductor manufacturing is an imprecise process and often involves one or more defects (or other variances relative to design specification) in the manufactured ICs. Such defects in manufacturing does not necessarily result in inoperable chips; in many cases, chips with manufacturing defects operate sufficiently with, for example, disabling of non-critical parts that are defective and/or with lower performance characteristics relative to design specifications. A given design specification will result in a distribution of power and performance characteristics in the resulting manufactured chips (including chips formed on a same silicon wafer and chips from different wafers) due to various defects.

Accordingly, in various embodiments, product binning includes characterizing of manufactured IC chips based on their characteristics. To undergo manufacturing sort or binning, the manufactured products require testing, usually performed by machines in bulk. Binning allows variances in individual chip performance to be condensed into a smaller number of different marketed designations (e.g., different "bins") when defining operating performances of the chips during binning processes. A chip, for example, is sorted into different bins, each bin having differing market stock keeping units (SKUs) associated with differing operating performance characteristics. This allows for coherency in the marketplace, with multiple tiers of delineated performance. A consequence of binning practice is that products sold under a certain designation must meet that designation at a minimum; however, individual products sometimes exceed that minimum performance designation (different bins usually having different SKUs/model numbers and pricing).

As will be appreciated, randomly selecting dies from amongst different product bins for inclusion in a multi-chip module (e.g., individual processors 102) will conventionally result in heterogeneous systems in which each individual die within processors 102 (and also each individual processor relative to other processors 102) is likely to perform differently from other dies at the same power level (even amongst multiple dies from a single silicon wafer that are manufactured according to the same design specification). This performance variance is problematic in, for example, compute systems that include many processors that work together on a parallel bulk-synchronous problem in which both computation and communication/synchronization performance depend on properties of the machine architecture in use. In particular, a system that includes multiple processors working together such as multi-chip modules will be performance constrained by the performance of its slowest processor due to faster processors idling while waiting on the slowest processor to finish compute before barrier synchronization.

Accordingly, as described in more detail herein, each of the individual processors 102 include two or more integrated circuit dies within a single semiconductor chip package. Rather than the two or more integrated circuit dies of the multi-die processors 102 sharing common power supply rails (which would result in dies within a processor 102 operating under the same electric conditions, and thus result in variable die performance), in various embodiments, a power management controller of (or operatively coupled to) an individual processor 102 is configured to perform energy sloshing by distributing a level of power allocated to the individual processor 102 between the first IC die and the second IC die. In this manner, power is allocated to individual environments (e.g., electrical domain) associated with each chip based on determined die performance differentials.

In various embodiments, energy distribution between dies includes, for example, relative adjustment or scaling of the voltages applied during system runtime to the different dies to rebalance the relative performance and power consumption of these dies within each multi-die package (e.g., processor 102 as a multi-chip module). In other words, power is preferentially allocated to one or more die having lower intrinsic performance/speed (e.g., due to manufacturing variances) to increase the voltage and/or operating frequency of that one or more die relative to another die of the multi-die package. In this manner, performance differentials between dies of a multi-die package is decreased and the net result is an increase in overall system 100 performance in a fixed power budget by directing the power to the processor dies most in need of additional performance (e.g., the slowest dies). Further, reducing the performance spread between dies also reduces an amount of time that all other dies of a multi-die package are idling while waiting on the slowest die to finish computations.

Figure 2:
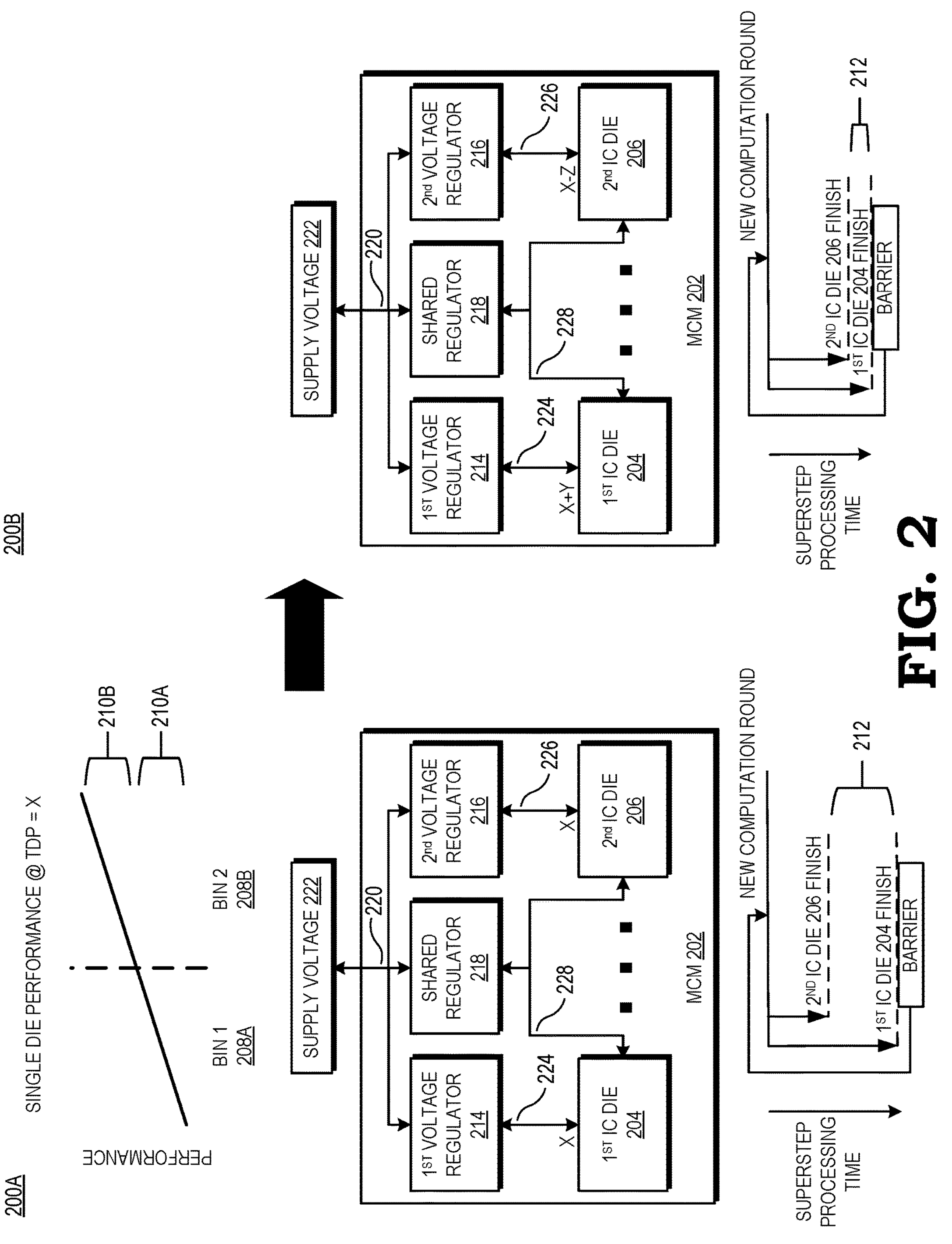
FIG. 2 is a diagram illustrating energy distribution between dies within a multi-chip module in accordance with some embodiments.

Referring now to FIG. 2, illustrated is a diagram of energy distribution between dies within a multi-chip module in accordance with some embodiments. A multi-chip module 202 (e.g., processor 102 of FIG. 1) is formed as a single semiconductor chip package including N number of dies. As shown in panel view 200A, the multi-chip module 202 includes a first IC die 204 and a second IC die 206. As previously mentioned and illustrated in panel view 200A, a given chip design specification will result in a distribution of power and performance characteristics in the resulting manufactured chips (including chips formed on a same silicon wafer and chips from different wafers) due to various manufacturing variances and defects. Product binning includes characterizing of manufactured IC chips based on their characteristics and allows variances in individual chip performance to be condensed into a smaller number of different designations (e.g., different bins) when defining operating performances of the chips during binning processes.

By way of example and not limitation, in various embodiments, dies are sorted into two different bins 208A-B based on their single-die performance at a given total board power (TBP) of value 'X'. However, in various embodiments, binning includes any number of a plurality of bins 208 (e.g., three, four, or more bins 208) without departing from the scope of this disclosure. Each individual die will have individual performance characteristics given a same power source limitation (referred to as that die's 'intrinsic performance' at, for example, a given TBP=X). That is, even when manufactured to a same design specification and operated at a same power level, manufactured dies will inherently have differing intrinsic performance levels relative to one another due to manufacturing variances. The first IC die 204 includes a die from bin 208A associated with a first range of intrinsic performances 210A. The second IC die 206 includes a die from bin 208B associated with a second range of intrinsic performances 210B. Dies associated with the second range of intrinsic performances 210B generally have a higher level of performance at TBP=X relative to dies associated with the first range of intrinsic performances 210A.

Accordingly, for a given multi-die computation operation such as bulk synchronous parallel applications in which participating processors (e.g., individual IC dies 204 and 206) perform concurrent computation asynchronously of others, the first IC die 204 will take a longer period of time to finish its assigned task and reach a synchronization barrier. The inherently faster (or otherwise higher performing) second IC die 206 finishes faster when operating at the same power level of TBP=X as the first IC die 204, resulting in a performance spread 212 during which the second IC die 206 idles while waiting on the straggler (i.e., the slower IC die 204) at each iteration of the computation super-step.

Referring now to panel view 200B, the multi-chip module 202 includes (or is otherwise operatively coupled to) a power management controller having a first voltage regulator 214, a second voltage regulator 216, and a shared voltage regulator 218. To improve overall performance, in various embodiments, the power management controller (not shown) is configured to distribute a level of power (e.g., TBP 220 from a shared supply voltage 222) allocated to the entire multi-chip module 202 by energy sloshing between the first IC die 204 and the second IC die 206.

In various embodiments, the first voltage regulator 214 controls an amount of voltage delivered to the first IC die 204 via a first voltage rail 224 that is unique to the first IC die 204 (i.e., unshared with other IC dies). Similarly, the second voltage regulator 216 controls an amount of voltage delivered to the second IC die 206 via a second voltage rail 226 that is unique to the second IC die 206 (i.e., unshared with the other IC dies). Rather than operating both IC dies at the same voltage X, the first voltage regulator 214 delivers a voltage of X+Y to the first IC die 204 and the second voltage regulator 216 delivers a voltage of X−Z to the second IC die 206. It should be recognized that the additional voltage delivered to the first IC die 204 is not necessarily the same as the voltage decrease to the second IC die 206. Additionally, in various embodiments, the shared voltage regulator 218 of the multi-chip module 202 controls an amount of voltage via shared voltage rail 228 that is shared by both the first IC die 204 and the second IC die 206.

In this manner, the multi-chip module 202 shifts more power to the less intrinsically performant first IC die 204 and reduces the performance spread 212 (e.g., relative to panel view 200A in which both IC dies operate under the same power conditions). That is, the unique voltage regulators 214, 216 provide independent control over their associated unique voltage rails 224, 226 and increasing or decreasing voltage values delivered to their respective IC dies 204, 206—the slower die (e.g., first IC die 204) will receive higher voltage for running higher frequency clocks to run faster and catch up with the other naturally faster die(s) (e.g., second IC die 206). By energy sloshing between IC dies in a multi-chip module 202 to run each IC die closer in performance to one another regardless of their intrinsic performances of the individual dies, the average performance of the entire multi-chip module 202 also improves due to faster computation by the first IC die 204 (e.g., the gating factor) upon which other IC dies must wait upon before barrier synchronization and starting of a new round of computations.

It should be recognized that the multi-chip module 202 of FIG. 2 is described in the context of die-pairing for ease of illustration and description. However, those skilled in the art will recognize that, in various embodiments the multi-chip module 202 include any number of a plurality of dies in a package without departing from the scope of this disclosure. In various embodiments, the power management control for energy sloshing between IC dies within the multi-chip module 202 is implemented in any of hardware, software, firmware, and/or any combination of the above.

Figure 3:
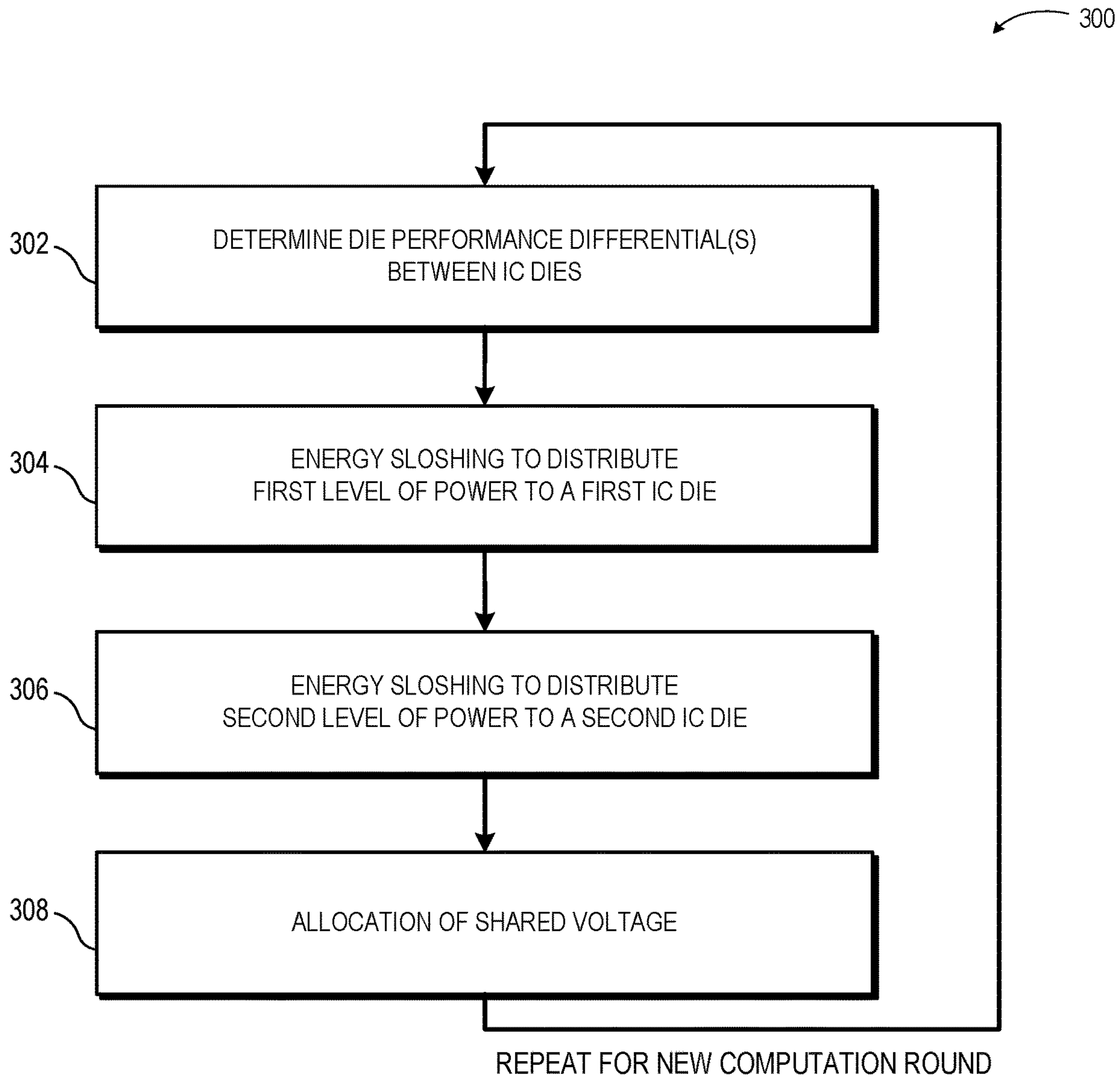
FIG. 3 is a flow diagram of a method for employing energy distribution between dies in a multi-die system in accordance with some embodiments.

FIG. 3 is a block diagram of a method 300 for employing energy sloshing between dies in a multi-die system in accordance with some embodiments. The method 300 is described below in the example context of the die-pairing configuration described with respect to FIG. 2. However, the method 300 is not limited to this example context, but in various embodiments is instead employed for any of a variety of possible configurations of multi-die processors 102 and any combination of shared and/or unique voltage rails using the guidelines provided herein.

The method 300 initiates at block 302 for an iteration of multi-die computation with determination by a power management controller of die performance differential(s) between IC dies of a multi-die semiconductor die package. With reference to FIG. 2, the multi-die semiconductor die package (e.g., multi-chip module 202) includes a first IC die 204 and a second IC die 206 are sourced, respectively, from two different bins 208A-B associated with differing single-die performance at a given total board power (TBP) of value 'X'. The first IC die 204 includes a die from bin 208A associated with a first range of intrinsic performances 210A.

The second IC die 206 includes a die from bin 208B associated with a second range of intrinsic performances 210B. Dies associated with the second range of intrinsic performances 210B generally have a higher level of performance at TBP=X relative to dies associated with the first range of intrinsic performances 210A.

In at least one embodiment, at block 302, the power management controller determines a first set of performance characteristics particular to the first IC die 204. The first set of performance characteristics is generally within the first range of intrinsic performances 210A. In various embodiments, the term 'performance characteristics' refers to any characteristic upon which die binning is performed including, but not limited to, various voltages and clock frequencies at which test routine is run and the results of such tests, which include maximum clock frequency at a given voltage run on a chip under test. Additionally, in various embodiments, performance characteristics include measured leakage currents at particular operating points, frequency, voltage, and leakage as indicators of expected performance, and the like. Further, in some embodiments, performance characteristics include total die power for specific workloads at specific frequencies, frequencies achieved for a specific workload at a specific total die power, and the like.

In various embodiments, a testing apparatus (not shown) encodes intrinsic performance characteristics information, including for example speed and leakage information) on each chip (or die) at time of testing. Such intrinsic performance characteristics information includes, in various embodiments, performance of a chip (or an average performance of chips within a bin) relative to an established baseline performance level. In some embodiments, chip testing is performed at a power-up phase (e.g., each time the system 100 is powered up) and the intrinsic performance characteristics information is stored in non-volatile memory. In other embodiments, a power management controller (e.g., voltage regulators 214-218 of FIG. 2 or other power controller) dynamically performs chip testing during run-time using, for example, an extra circuit (not shown) included with each MCM or board for purposes of determining speed and leakage of multi-die packages.

At block 302, the power management controller determines a second set of performance characteristics particular to the second IC die 206. The second set of performance characteristics is generally within the second range of intrinsic performances 210B. The method 300 then proceeds to the energy sloshing of blocks 304 and 306 for distributing, based on a determined die performance differential between the first IC die 204 and the second IC die 206, a level of power 220 allocated to the semiconductor chip package between the first IC die 204 and the second IC die 206.

At block 304, the power management controller controls distribution of a first level of power to the first IC die 204 such that operating the first IC die 204 at the first level of power results in performance exceeding an intrinsic performance level of the first IC die 204. In various embodiments, each individual die will have individual performance characteristics given a same power source limitation (referred to as that die's 'intrinsic performance' at, for example, a given TBP). In various embodiments, and with continued reference to FIG. 2, the operations of block 304 include a first voltage regulator 214 controlling an amount of voltage delivered to the first IC die 204 via a first voltage rail 224 that is unique to the first IC die 204 (i.e., unshared with other IC dies). Rather than operating both IC dies at the same voltage X, the first voltage regulator 214 delivers a voltage of X+Y to the first IC die 204.

At block 306, the power management controller controls distribution of a second level of power to the second IC die 206 such that operating the second IC die 206 at the second level of power results in performance lower than an intrinsic performance level of the second IC die 206. In various embodiments, and with continued reference to FIG. 2, the operations of block 306 include a second voltage regulator 216 controlling an amount of voltage delivered to the second IC die 206 via a second voltage rail 226 that is unique to the second IC die 206 (i.e., unshared with the other IC dies). Rather than operating both IC dies at the same voltage X, the second voltage regulator 216 delivers a voltage of X−Z to the second IC die 206.

The energy sloshing of blocks 304 and 306 shifts more power to the less intrinsically performant first IC die 204 and reduces the performance spread 212 (e.g., relative to panel view 200A in which both IC dies operate under the same power conditions). That is, the unique voltage regulators 214, 216 provide independent control over their associated unique voltage rails 224, 226 and increasing or decreasing voltage values delivered to their respective IC dies 204, 206—the slower die (e.g., first IC die 204) will receive higher voltage such that it runs higher frequency clocks to run faster and catch up with the other naturally faster die(s) (e.g., second IC die 206).

In some embodiments, the operations of method 300 also include an optional block 308 at which a shared voltage regulator 218 of the multi-chip module 202 controls an amount of voltage via shared voltage rail 228 that is shared by both the first IC die 204 and the second IC die 206. Subsequently, the operations of method 300 repeat for a new round of multi-die computations.

Those skilled in the art will recognize that although FIGS. 2 and 3 are described here in the context of a die-paired multi-chip module, the concepts of energy sloshing amongst multiple processors is similarly applicable to various other system configurations without departing from the scope of this disclosure. For example, in various embodiments, total power of a system is dynamically distributed to be adaptive to a variety of other conditions of an environment the system is operating in, including for example, different temperatures that various processors are running at, guarding against voltage allocations that exceed $V_{max}$ limitations, and the like.

Figure 4:
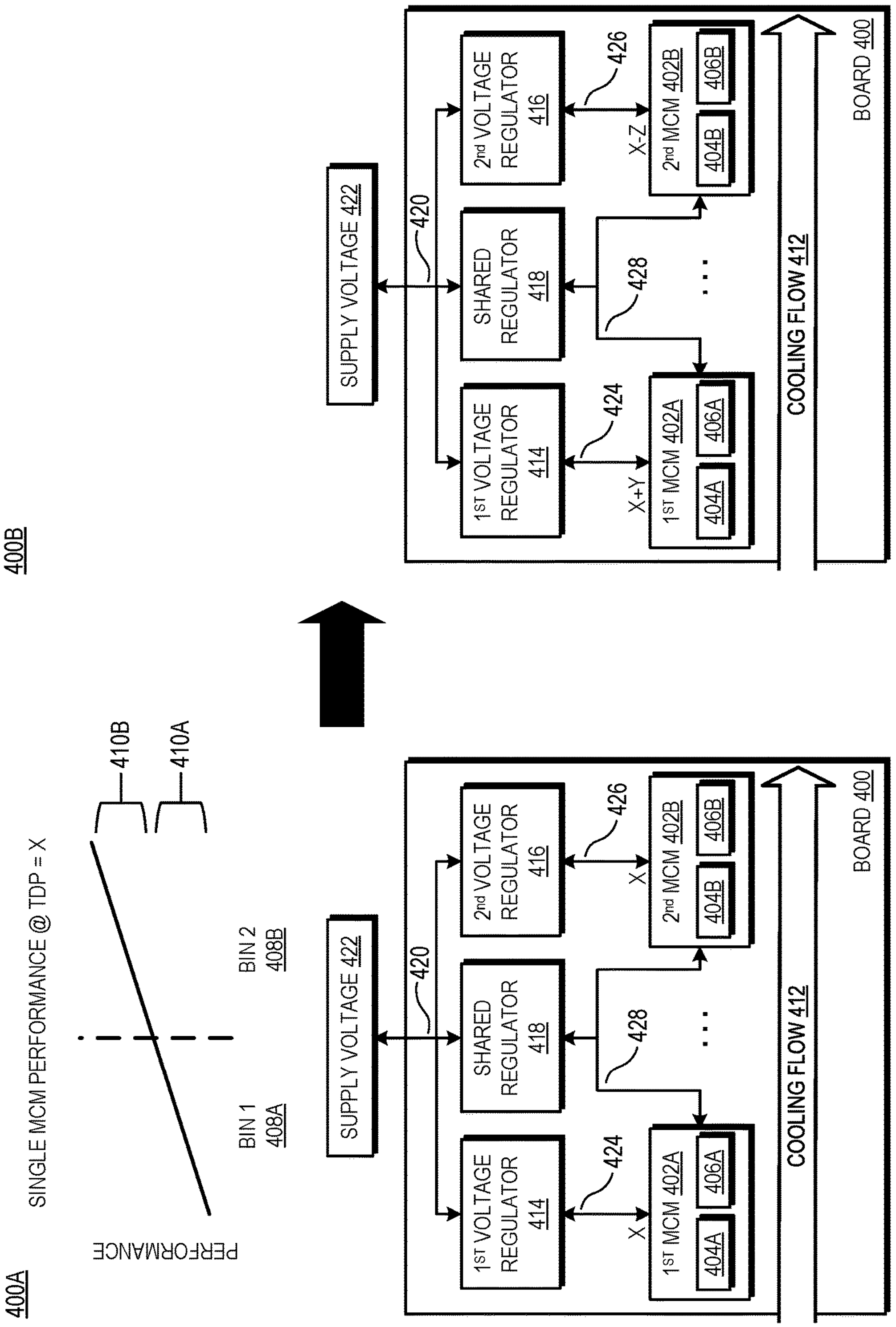
FIG. 4 is a diagram illustrating energy distribution between multi-chip modules in accordance with some embodiments.

FIG. 4 is a diagram illustrating energy sloshing between multi-chip modules in accordance with some embodiments. As illustrated, similar to FIG. 2 but at a different level of granularity at the board level, a circuit board 400 includes a plurality of multi-chip modules 402 (e.g., processor 102 of FIG. 1). Each multi-chip module 402 is formed as a single semiconductor chip package including a plurality of dies, such as previously discussed with respect to FIG. 2. As shown, the circuit board includes a first MCM 402A and a second MCM 402B.

The first MCM 402A includes a first IC die 404A and a second IC die 406A (similar to the multi-chip module 202 of FIG. 2). The second MCM 402B includes first IC die 404B and a second IC die 406B (similar to the multi-chip module 202 of FIG. 2). Each individual die will have individual performance characteristics given a same power source limitation (referred to as that die's 'intrinsic performance' at, for example, a given TBP=X). The first IC dies 404A and 404B of the first MCM 402A and the second MCM 402B, respectively, include a die from bin 208A of FIG. 2 associated with a first range of intrinsic performance 210A. Similarly, the second IC dies 406A and 406B of the first MCM 402A and the second MCM 402B, respectively, include a die from bin 208B of FIG. 2 associated with a second range of intrinsic performance 210B.

Although the first IC die 404A of the first MCM 402A and the first IC die 404B of the second MCM 402B are both sourced from bin 208A of FIG. 2 associated with a first range of intrinsic performances 210A, the first IC dies 404A, 404B are not identical and therefore will have their own respective intrinsic performance levels. Similarly, although the second IC die 406A of the first MCM 402A and the second IC die 406B of the second MCM 402B are both sourced from bin 208B of FIG. 2 associated with a second range of intrinsic performances 210B, the second IC dies 406A, 406B are not identical and therefore will have their own respective intrinsic performance levels. Accordingly, the resulting first MCM 402A and the second MCM 402B will also have a variance in distribution of power and performance characteristics.

By way of example and not limitation, in various embodiments, MCM processors 402 are sorted into two different bins 408A-B based on their single-MCM package performance at a given total board power (TBP) of value 'X'. However, in various embodiments, any number of a plurality of bins 408 (e.g., three, four, or more bins 208) are utilized without departing from the scope of this disclosure. Each individual MCM 402 will have individual performance characteristics given a same power source limitation (referred to as that MCM's 'intrinsic performance' at, for example, a given TBP=X). The circuit board 400 includes a first MCM 402A from bin 408A associated with a first range of intrinsic performance 410A. The circuit board 400 also includes a second MCM 402B from bin 408B associated with a second range of intrinsic performance 410B. MCMs associated with the second range of intrinsic performance 410B generally have a higher level of performance at TBP=X relative to MCMs associated with the first range of intrinsic performance 410A.

Accordingly, for a given multi-processor computation operation such as bulk synchronous parallel applications in which participating processors (e.g., individual MCMs 402A and 402B) perform concurrent computation asynchronously of others, the MCMs will take differing amounts of time to finish its assigned task and reach a synchronization barrier. This is particularly problematic in system configurations such as servers employing hundreds or thousands of processors that work together on a parallel bulk-synchronous task, in which the performance of the whole system is limited by the performance of the slowest processor/MCM 402.

Further, in various embodiments, the performance of individual MCMs 402 is also influenced by the differing environments/conditions in which they operate. For example, as illustrated in FIG. 4, a cooling flow 412 (e.g., air cooling streams and the like) is oriented in the left-to-right direction such that the cooling flow 412 first encounters and dissipates heat from the first MCM 402A. Subsequently, the cooling flow 412 is warmed, has less capacity as a heat sink, and therefore dissipates less heat from the second MCM 402B. Therefore, the second MCM 402B operates less efficiently and/or at a lower level of performance than the first MCM 402A at a same, given TBP.

In various embodiments, the circuit board 400 includes (or is otherwise operatively coupled to) a power management controller having a first voltage regulator 414 and a second voltage regulator 416. In some embodiments, the circuit board 400 also includes a shared voltage regulator 418. To improve overall performance, in various embodiments, the power management controller (not shown) is configured to distribute a level of power (e.g., TBP 420 from a shared supply voltage 422) allocated to the entire circuit board by energy sloshing between the first MCM 402A and the second MCM 402B.

In various embodiments, the first voltage regulator 414 controls an amount of voltage delivered to the first MCM 402A via a first voltage rail 424 that is unique to the first MCM 402A (i.e., not shared with other MCM packages). Similarly, the second voltage regulator 416 controls an amount of voltage delivered to the second MCM 402B via a second voltage rail 426 that is unique to the second MCM 402B (i.e., not shared with the other MCM packages). Rather than operating both MCMs 402A, 402B at the same voltage X, the first voltage regulator 414 delivers a voltage of X+Y to the first MCM 402A and the second voltage regulator 416 delivers a voltage of X−Z to the second MCM 402B. Additionally, in some embodiments, the shared voltage regulator 418 of the circuit board 400 controls an amount of voltage via shared voltage rail 228 that is shared by both the first MCM 402A and the second MCM 402B.

In this manner, the multi-chip module 202 shifts more power to the less intrinsically performant first MCM 402A and reduces a performance spread between the MCMs 402. That is, the unique voltage regulators 414, 416 provide independent control over their associated unique voltage rails 424, 426 and increasing or decreasing voltage values delivered to their respective MCMs 402A, 402B—the slower MCM package (e.g., first MCM 402A) will receive higher voltage such that it runs perform faster and catch up with the other naturally faster MCM(s) (e.g., second MCM 402B). By energy sloshing between MCM packages in a multi-MCM board 400 to run each MCM 402 closer in performance to one another regardless of their intrinsic performances of the individual MCMs, the average performance of the entire circuit board 400 also improves due to faster computation by the first MCM 402A (e.g., the gating factor) upon which other IC dies must wait upon before barrier synchronization and starting of a new round of computations.

It should be recognized that the multi-MCM board 400 of FIG. 4 is described in the context of MCM-pairing for ease of illustration and description. However, those skilled in the art will recognize that, in various embodiments, the multi-MCM board 400 includes any number of a plurality of MCMs without departing from the scope of this disclosure. In various embodiments, the power management control for energy sloshing between IC dies within the multi-MCM board 400 is implemented in any of hardware, software, firmware, and/or any combination of the above.

Additionally, it should be recognized that the equalizing/reduction in differentials between MCM performance in a multi-MCM board 400 is not limited to active power sloshing as described herein with respect to FIG. 4. In other embodiments, reducing performance differentials between MCMs includes positioning MCM packages having intrinsically higher levels of performance (e.g., second MCM 402B) downstream (with respect to the cooling flow 412) of less efficient MCM packages. In this manner, a level of performance of the second MCM 402B is lowered (resulting from dissipation of less heat, with different local temperatures due to differences in cooling capabilities arising from physical location differences relative to cooling flow 412) to be closer in performance to that of the first MCM 402A.

Figure 5:
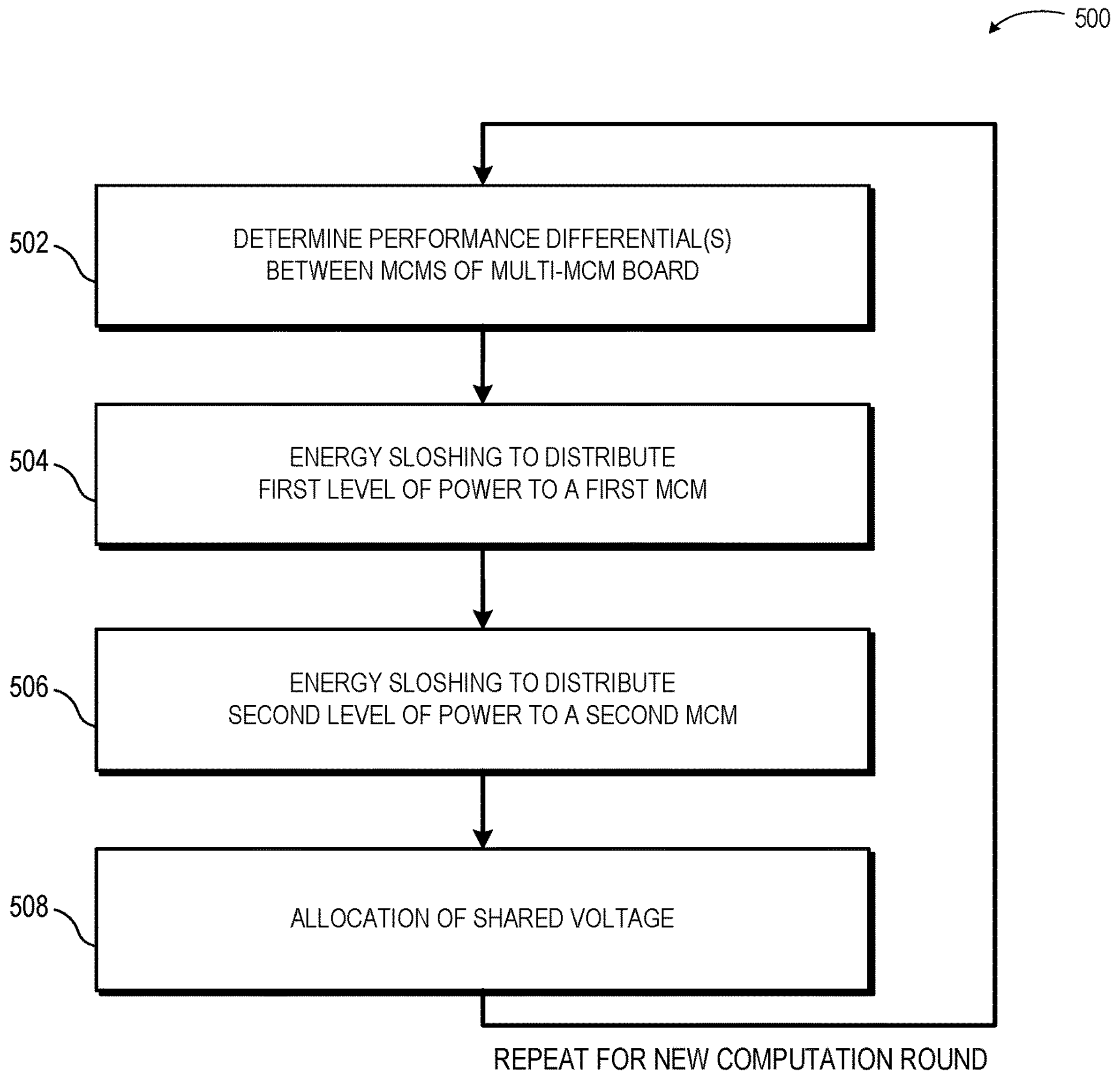
FIG. 5 is a flow diagram of a method for employing energy distribution between multi-chip modules in accordance with some embodiments.

FIG. 5 is a flow diagram of a method 500 for employing energy sloshing between multi-chip modules in accordance with some embodiments. The method 500 is described below in the example context of the MCM-pairing configuration described with respect to FIG. 4. However, the method 500 is not limited to this example context, but instead includes any of a variety of possible configurations of circuit boards 400 including a plurality of multi-chip modules 402 and any combination of shared and/or unique voltage rails using the guidelines provided herein.

The method 500 initiates at block 502 for an iteration of multi-MCM computation with determination by a power management controller of MCM performance differential(s) between MCMs of a multi-MCM board. With reference to FIG. 4, the multi-MCM board (e.g., circuit board 400) includes a first MCM 402A and a second MCM 402B. The first MCM 402A includes a first IC die 404A and a second IC die 406A (similar to the multi-chip module 202 of FIG. 2). The second MCM 402B includes first IC die 404B and a second IC die 406B (similar to the multi-chip module 202 of FIG. 2). Each individual die will have individual performance characteristics given a same power source limitation (referred to as that die's 'intrinsic performance' at, for example, a given TBP=X). The first IC dies 404A and 404B of the first MCM 402A and the second MCM 402B, respectively, include a die from bin 208A of FIG. 2 associated with a first range of intrinsic performance 210A. Similarly, the second IC dies 406A and 406B of the first MCM 402A and the second MCM 402B, respectively, include a die from bin 208B of FIG. 2 associated with a second range of intrinsic performance 210B.

The resulting first MCM 402A and the second MCM 402B have a variance in distribution of power and performance characteristics, due at least in part to performance variances of their respective components (e.g., first IC dies 404A, 404B and second IC dies 406A, 406B). Accordingly, each individual MCM 402 will have individual performance characteristics given a same power source limitation (referred to as that MCM's 'intrinsic performance' at, for example, a given TBP=X). The circuit board 400 includes a first MCM 402A from bin 408A associated with a first range of intrinsic performance 410A. The circuit board 400 also includes a second MCM 402B from bin 408B associated with a second range of intrinsic performance 410B. MCMs associated with the second range of intrinsic performance 410B generally have a higher level of performance at TBP=X relative to MCMs associated with the first range of intrinsic performance 410A.

In at least one embodiment, at block 502, the power management controller determines a first set of performance characteristics particular to the first MCM 402A. The first set of performance characteristics is generally within the first range of intrinsic performances 410A. Additionally, at block 302, the power management controller determines a second set of performance characteristics particular to the second MCM 402B. The second set of performance characteristics is generally within the second range of intrinsic performances 410B. The method 500 then proceeds to the energy sloshing of blocks 504 and 506 for distributing, based on a determined MCM performance differential between the first MCM 402A and the second MCM 402B, a level of power 420 allocated to the circuit board 400 between the first MCM 402A and the second MCM 402B.

At block 504, the power management controller controls distribution of a first level of power to the first MCM 402A such that operating the first MCM 402A at the first level of power results in performance exceeding an intrinsic performance level of the first MCM 402A. In various embodiments, each individual die will have individual performance characteristics given a same power source limitation (referred to as that die's 'intrinsic performance' at, for example, a given TBP). In various embodiments, and with continued reference to FIG. 4, the operations of block 504 include a first voltage regulator 414 controlling an amount of voltage delivered to the first MCM 402A via a first voltage rail 424 that is unique to the first MCM 402A (i.e., not shared with other MCM packages). Rather than operating both MCMs at the same voltage X, the first voltage regulator 414 delivers a voltage of X+Y to the first MCM 402A.

At block 506, the power management controller controls distribution of a second level of power to the second MCM 402B such that operating the second MCM 402B at the second level of power results in performance lower than an intrinsic performance level of the second MCM 402B. In various embodiments, and with continued reference to FIG. 4, the operations of block 506 include a second voltage regulator 416 controlling an amount of voltage delivered to the second MCM 402B via a second voltage rail 426 that is unique to the second MCM 402B (i.e., not shared with the other MCM packages). Rather than operating both MCM packages at the same voltage X, the second voltage regulator 416 delivers a voltage of X−Z to the second MCM 402B.

The energy sloshing of blocks 504 and 506 shifts more power to the less intrinsically performant first MCM 402A and reduces the performance spread between MCMs (e.g., relative to operating each MCM 402 under the same power conditions). That is, the unique voltage regulators 414, 416 provide independent control over their associated unique voltage rails 424, 426 and increasing or decreasing voltage values delivered to their respective MCMs 402A, 402B—the slower MCM package (e.g., first MCM 402A) will receive higher voltage such that it runs higher frequency clocks to run faster and catch up with the other naturally faster MCM(s) (e.g., second MCM 402B).

In some embodiments, the operations of method 500 also include an optional block 508 at which a shared voltage regulator 418 of the circuit board 400 controls an amount of voltage via shared voltage rail 428 that is shared by both the first MCM 402A and the second MCM 402B. Subsequently, the operations of method 500 repeat for a new round of multi-MCM computations.

Accordingly, as described herein, energy sloshing between dies of a multi-die package (and/or between MCMs of a multi-MCM board) increases overall system performance by increasing average performance of an entire multi-chip module without changing the actual design specification of the IC dies. That is, performance differentials between IC dies is reduced without lowering performance of intrinsically higher performing IC dies down to the lowest common denominator (i.e., the slowest IC dies). Thus, energy sloshing between dies also allows for an increased number of manufactured silicon dies to be utilized within a higher performing system than would result from a random selection of die into MCMs and/or creation of multiple different systems having different operating specifications according to different product bins.

A computer readable storage medium includes any non-transitory storage medium, or combination of non-transitory storage media, accessible by a computer system during use to provide instructions and/or data to the computer system. Such storage media include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software includes the instructions and certain data that, when executed by the one or more processors, manipulate the one or more processors to perform one or more aspects of the techniques described above. The non-transitory computer readable storage medium include, for example, a magnetic or optical disk storage device, solid state storage devices such as Flash memory, a cache, random access memory (RAM) or other non-volatile memory device or devices, and the like. The executable instructions stored on the non-transitory computer readable storage medium include source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A semiconductor chip package, comprising:

a first circuit having a first intrinsic performance level;

a second circuit, manufactured to a same design specification as the first circuit, and having a second intrinsic performance level different from the first intrinsic performance level, wherein a total sum of power allocated to the first circuit to operate at the first intrinsic performance level and allocated to the second circuit to operate at the second intrinsic performance level is equal to a power budget;

a power management controller configured to distribute the power budget from a single shared supply voltage between the first circuit and the second circuit to reduce a performance differential between the first circuit and the second circuit;

a first voltage regulator configured to adjust a first amount of voltage delivered to the first circuit via a first voltage rail from the single shared supply voltage; and a second voltage regulator configured to adjust a second amount of voltage delivered to the second circuit via a second voltage rail from the single shared supply voltage.

2. The semiconductor chip package of claim 1, wherein the first circuit is from a first plurality of circuits determined to have a first range of intrinsic performance, and wherein the second circuit is from a second plurality of circuits determined to have a second range of intrinsic performance different from the first range of intrinsic performance.

3. The semiconductor chip package of claim 1, wherein the performance differential includes speed and leakage information determined during power-up testing.

4. The semiconductor chip package of claim 1, wherein the power management controller is configured to distribute a first level of power to the first circuit that causes performance of the first circuit to exceed the first intrinsic performance level, and wherein the power management controller is configured to distribute a second level of power to the second circuit.

5. The semiconductor chip package of claim 1, further comprising:

a shared voltage regulator configured to control a third amount of voltage delivered via a shared voltage rail to the first circuit and the second circuit.

6. A method, comprising:

detecting a performance differential between a first circuit and a second circuit of a semiconductor chip package, wherein the first circuit is manufactured to a same design specification as the second circuit, wherein the first circuit has a first intrinsic performance level and the second circuit has a second intrinsic performance level different from the first intrinsic performance level, and wherein a total sum of power allocated to the first circuit to operate at the first intrinsic performance level and allocated to the second circuit to operate at the second intrinsic performance level is equal to a power budget; and distributing the power budget from a single shared supply voltage between the first circuit and the second circuit to reduce the performance differential between the first circuit and the second circuit, wherein distributing the power budget comprises:

adjusting, at a first voltage regulator, a first amount of voltage delivered to the first circuit via a first voltage rail from the single shared supply voltage; and adjusting, at a second voltage regulator, a second amount of voltage delivered to the second circuit via a second voltage rail from the single shared supply voltage.

7. The method of claim 6, wherein distributing the power budget further comprises:

distributing a first level of power to the first circuit, wherein operating the first circuit at the first level of power results in performance that exceeds the first intrinsic performance level.

8. The method of claim 6, wherein distributing the power budget further comprises:

distributing the power budget between the first circuit and the second circuit such that both of the first circuit and the second circuit perform at a level outside an intrinsic range of performance.

9. The method of claim 6, wherein causing performance of the first circuit to exceed the first intrinsic performance level increases computation throughput of the semiconductor chip package.

10. The method of claim 6, wherein the second intrinsic performance level is higher than the first intrinsic performance level.

11. The method of claim 10, wherein the first intrinsic performance level corresponds to an operating speed of the first circuit and the second intrinsic performance level corresponds to an operating speed of the second circuit.

12. A non-transitory computer readable medium embodying a set of executable instructions, the set of executable instructions to manipulate at least one processor to:

detect a performance differential between a first circuit and a second circuit of a semiconductor chip package, wherein the second circuit is manufactured to a same design specification as the first circuit, wherein the first circuit is associated with a first intrinsic performance level and the second circuit is associated with a second intrinsic performance level different from the first intrinsic performance level, and wherein a total sum of power allocated to the first circuit to operate at the first intrinsic performance level and allocated to the second circuit to operate at the second intrinsic performance level is equal to a power budget;

distribute the power budget from a single shared supply voltage between the first circuit and the second circuit to reduce the performance differential between the first circuit and the second circuit;

adjust, at a first voltage regulator, a first amount of voltage delivered to the first circuit via a first voltage rail from the single shared supply voltage; and adjust, at a second voltage regulator, a second amount of voltage delivered to the second circuit via a second voltage rail from the single shared supply voltage.

13. The non-transitory computer readable medium of claim 12, wherein the set of executable instructions further manipulate the at least one processor to:

distribute a first level of power to the first circuit, wherein operating the first circuit at the first level of power results in performance that exceeds the first intrinsic performance level.

14. The non-transitory computer readable medium of claim 12, wherein the set of executable instructions further manipulate the at least one processor to:

distribute the power budget between the first circuit and the second circuit such that both of the first circuit and the second circuit perform at levels outside respective intrinsic ranges of performance.

* * * * *